United States Patent

[11] 3,526,192

| [72] | Inventor | Bert B. Parshall<br>Wood Dale, Illinois |
|---|---|---|
| [21] | Appl. No. | 697,778 |
| [22] | Filed | Jan. 15, 1968 |
| [45] | Patented | Sept. 1, 1970 |
| [73] | Assignee | FMC Corporation<br>a corporation of Delaware |

[54] TOW TRUCK SWITCHING SYSTEM
11 Claims, 18 Drawing Figs.

[52] U.S. Cl. .................................................. 104/88, 104/172
[51] Int. Cl. .................................................. B61j 3/00
[50] Field of Search ........................................ 104/88, 170, 172

[56] References Cited
UNITED STATES PATENTS
3,406,638  10/1968  Braun ........................... 104/88

*Primary Examiner*—Duane A. Reger
*Attorney*—Irons, Birch, Swindler and McKie

ABSTRACT: A tow truck system having an electrically actuated switching means including a switch plate movable between an operative and an inoperative position, said switch plate in its operative position presenting an abutment surface in the main slot of the tow truck system for contact with a tow pin mounted on a tow truck travelling along the main slot to guide the tow pin into the shunt slot associated with the switching means. The switch plate is spring biased to its operative position and provided with a latch for normally retaining the switch in its inoperative position. The latch is released in response to an approaching tow truck closing a reed switch to complete an electrical circuit which energizes a solenoid connected by means of a toggle linkage to the latch in a manner to release the latter. As the tow pin of the tow truck enters the shunt slot it cams the switch plate into its inoperative position allowing the latch to re-engage and thus resetting the switch for the next properly coded truck.

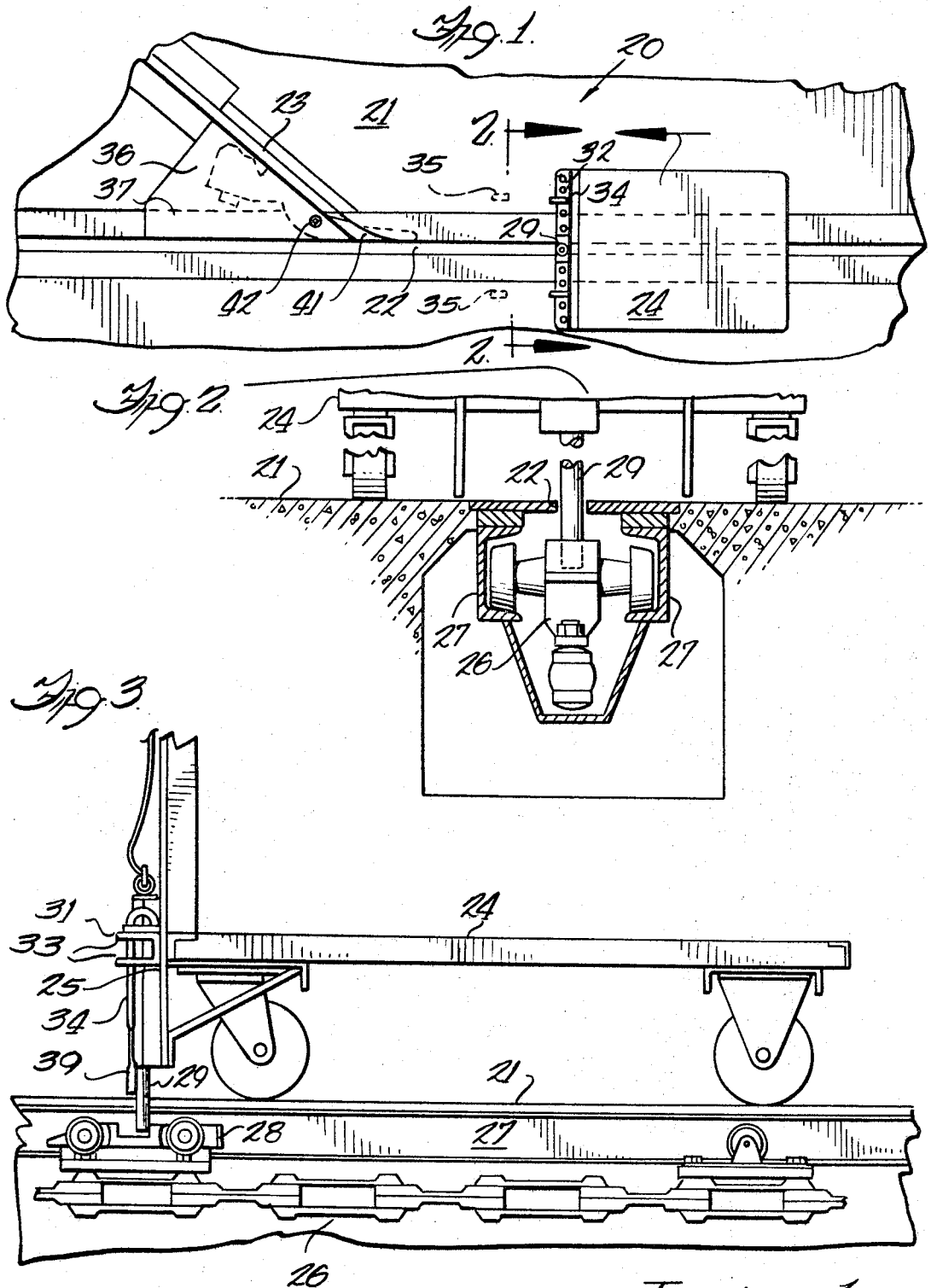

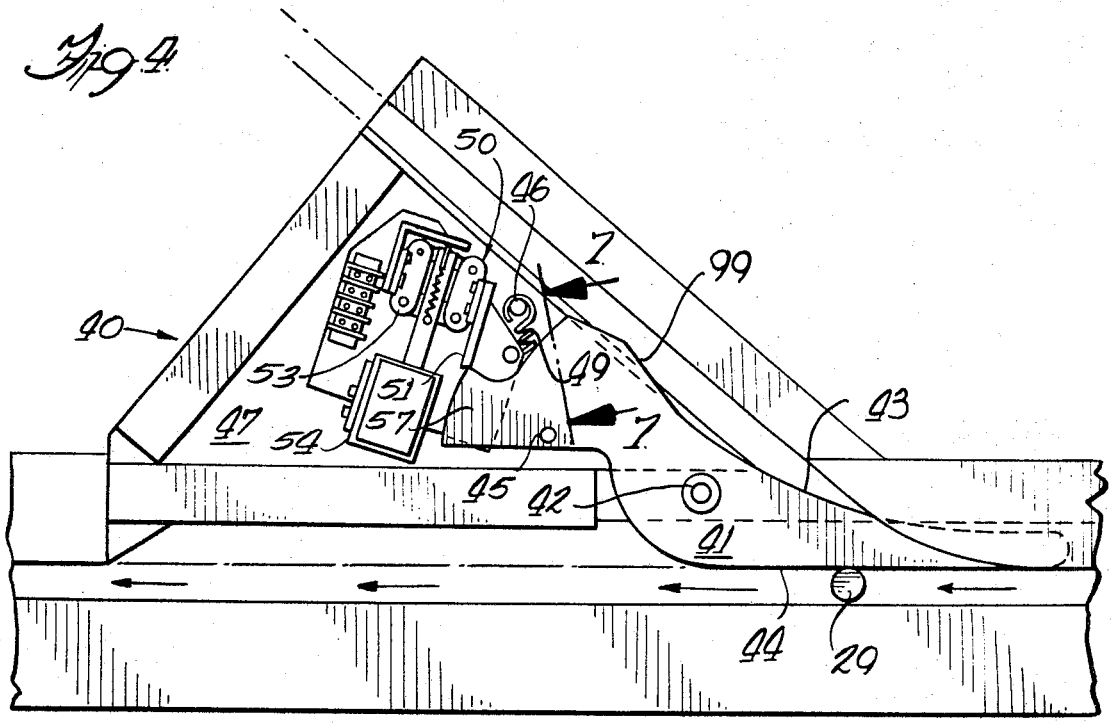
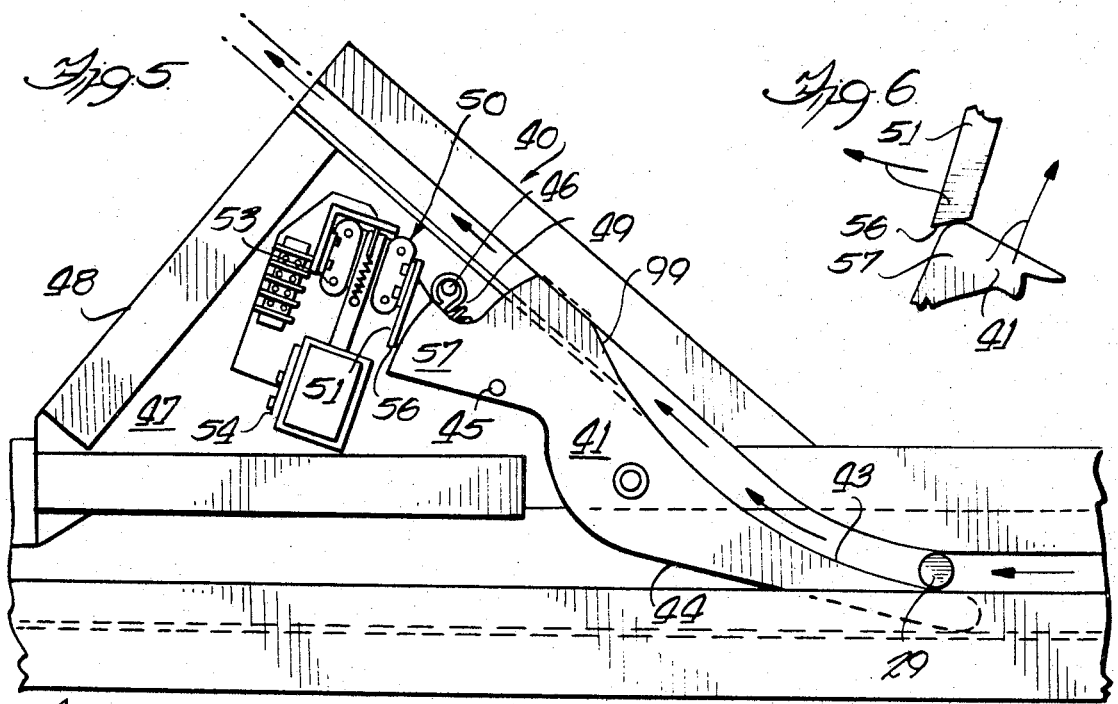
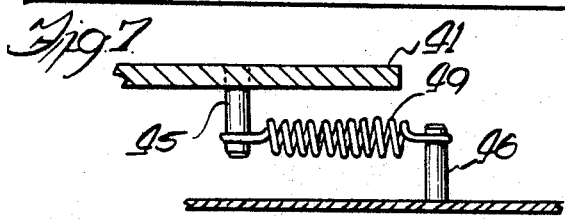

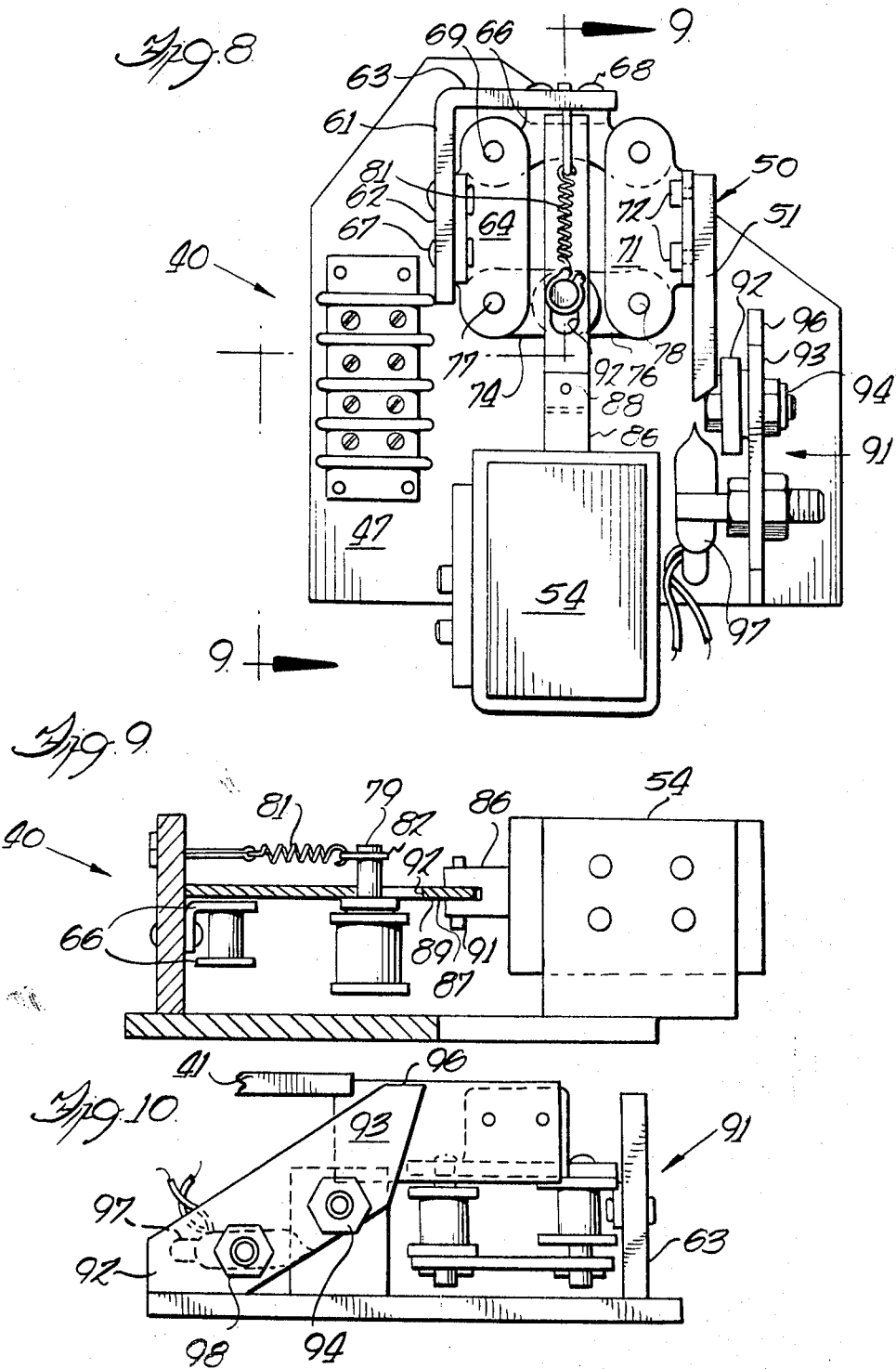

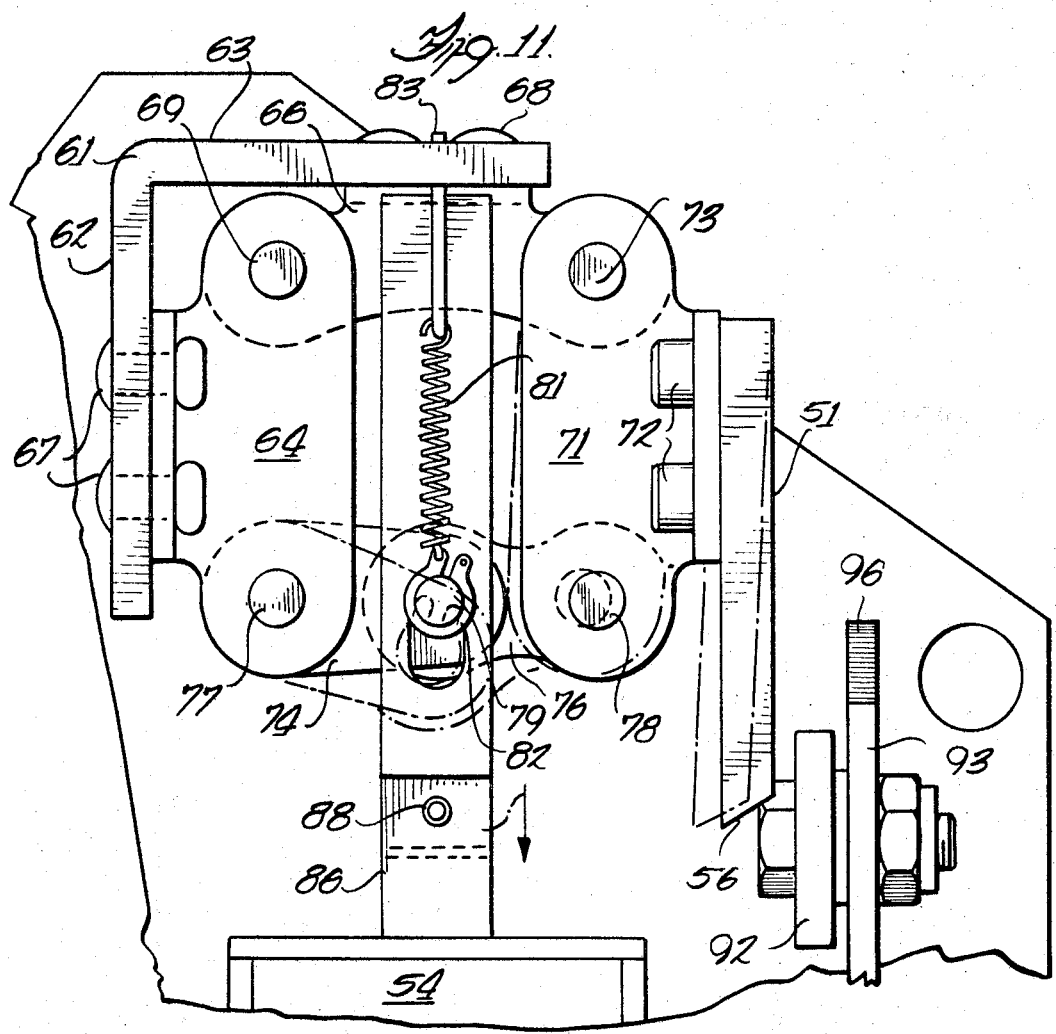
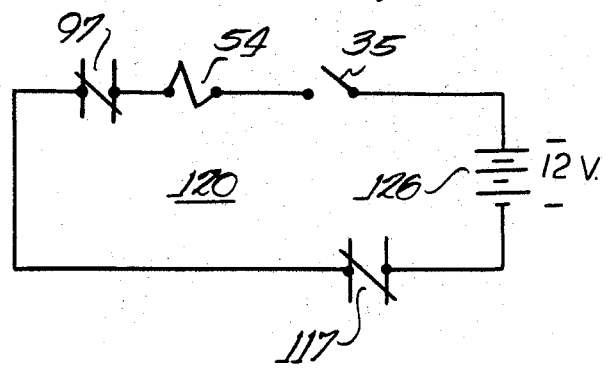

3,526,192

TOW TRUCK SWITCHING SYSTEM

BACKGROUND OF THE INVENTION

1. Field of the Invention

This invention relates to a tow truck system with automatic switching means, and more particularly refers to a tow truck system having a truck propelled by the engagement between the tow pin of the truck and a pusher dog on a chain conveyor disposed beneath the floor surface, with an electrically actuated switching device being provided to transfer the tow pin from the main slot to a shunt slot at a preselected station.

2. Description of the Prior Art

A tow truck system having electrically actuated switching means has been proposed heretofore, however, these electrically actuated switches required the use of a 110 volt circuit and thus have caused complications in reference to the various building codes in force in the various localities in which the switches are installed. This high voltage was necessary in the past to provide a sufficient amount of force to move the switch to its operative position.

Other actuating means for tow truck switches have been proposed in the past, such as mechanical actuation wherein a member mounted on the truck directly contacts a member disposed on the floor surface. The mechanically actuated switches include either a direct connection between the member disposed on the floor and the switch plate or various forms of linkages which physically move the switch plate into its operative position or release a latch to allow the switch plate to move under the urging of a spring. However, all mechanically actuated switches suffer from a common disadvantage in that if the mechanical linkage or direct connection assumes a jamming position, then the contact member on the tow truck can be broken off or damaged to the point where it requires replacement.

A further disadvantage is that all mechanically actuated switches require having an actuating member project upwardly from the floor to a position wherein it will be contacted by the truck. This projecting member on the floor can easily be damaged by fork-lift trucks which normally operate in the same area as the tow truck system, and said member presents a safety hazard to personnel since it provides a convenient object to trip over.

SUMMARY OF THE INVENTION

A tow truck switch, constructed in accordance with the present invention, includes a switch plate movable between an operative and an inoperative position, in its operative position the switch plate presents an abutment surface in the main slot for contact with a tow pin mounted on a tow truck which is being propelled along the main guide slot. Contact of the tow pin with the abutment surface will guide the tow pin into the associated shunt slot. The switch further includes a spring biasing means for urging the switch plate toward its operative position. Normally the switch plate is retained in its inoperative position by a latch means including a rotatably mounted latch blade adapted to engage the switch plate, a solenoid, and a toggle linkage means connecting the solenoid to the latch blade for releasing the latter when the solenoid is actuated.

Energization of the solenoid is accomplished when a proximity switch is closed by a properly coded tow truck travelling along the main slot. The proximity switch of the preferred embodiment of the present invention is a reed switch which is completely embedded in the floor thus presenting no upwardly projecting abutment. The reed switch is actuated by a magnet suspended from the truck and positioned to pass directly over the reed switch. The magnet closes the contacts of the reed switch which are held in their closed position by a solenoid until the circuit is broken to allow the solenoid to deenergize. The reed switch solenoid and the latch solenoid are deenergized in response to the switch plate moving from its inoperative to its operative position.

The present invention overcomes the disadvantage of previous electrically actuated switches by permitting the use of a low voltage circuit. A 12 volt battery may be employed for each individual switch or a centrally located 12 volt power source may be connected to the various switches of the system. Use of a battery with a tow truck switch, constructed according to the present invention, eliminates the necessity for the expensive wiring required by most building codes for use with a 110-volt circuit. If a central power source is utilized, then it may be connected to the individual switches throughout the system by means of inexpensive low voltage wiring.

The present invention overcomes the disadvantage of prior mechanically actuated switches by providing an actuation means which does not require any physical contact between a member mounted on the tow truck and a member projecting above the floor surface, thus eliminating the possibility of permanently damaging the actuating member or the components of the switch. Furthermore, this invention does not require having a member disposed above the floor surface to be contacted by a member mounted on a truck, thus there are no objectionable bumps or abutments projecting above the floor surface which may be damaged by fork-lift trucks or which may present safety hazards.

It is an object of the present invention to provide a novel tow truck system having an electrically actuated switching means.

It is another object of the present invention to provide a tow truck system, with an electrically actuated switching means, wherein the electric motor means employed in the switch may be energized by a low voltage.

It is still a further object of the present invention to provide a novel tow truck switching system wherein actuation of the switch does not require any contact between a member mounted on the tow truck and an abutment projecting upwardly from the floor surface.

Other objects and advantages of the present invention will be apparent from the following description of a preferred embodiment of the same.

DESCRIPTION OF THE DRAWINGS

In the accompanying drawings, forming a part of this specification and in which like reference characters are employed to designate like parts throughout the same:

FIG. 1 is a partial top plan view of a tow truck system incorporating the novel electrically actuated switching means of the present invention;

FIG. 2 is a transverse sectional view taken along lines 2—2 of FIG. 1;

FIG. 3 is a side view, partially in section, illustrating a tow truck and the drive chain disposed beneath the floor surface for propelling the truck;

FIG. 4 is an enlarged view of the switch illustrated in FIG. 1 with the cover plate removed and with the switch plate shown in its inoperative position;

FIG. 5 is an enlarged view similar to FIG. 4 but with the switch shown in its operative position;

FIG. 6 is a fragmentary enlarged view illustrating the engagement between the latch blade and a projection formed on the switch plate of the present invention;

FIG. 7 is a sectional view taken along line 7—7 of FIG. 4;

FIG. 8 is an enlarged view illustrating the solenoid, toggle linkage and latch blade of the present invention;

FIG. 9 is a sectional view taken along line 9—9 of FIG. 8;

FIG. 10 is a sectional view taken along line 10—10 of FIG. 8, illustrating the means for deenergizing the solenoid in response to moving the switch plate from its inoperative to its operative position;

FIG. 11 is an enlarged view of the toggle linkage and the latch blade illustrated in FIGS. 4 and 5, with the unlatched position of the latch blade and toggle linkage shown in phantom;

FIG. 18 illustrates the wiring diagram for the electrical circuit of the present invention.

Figure 12:
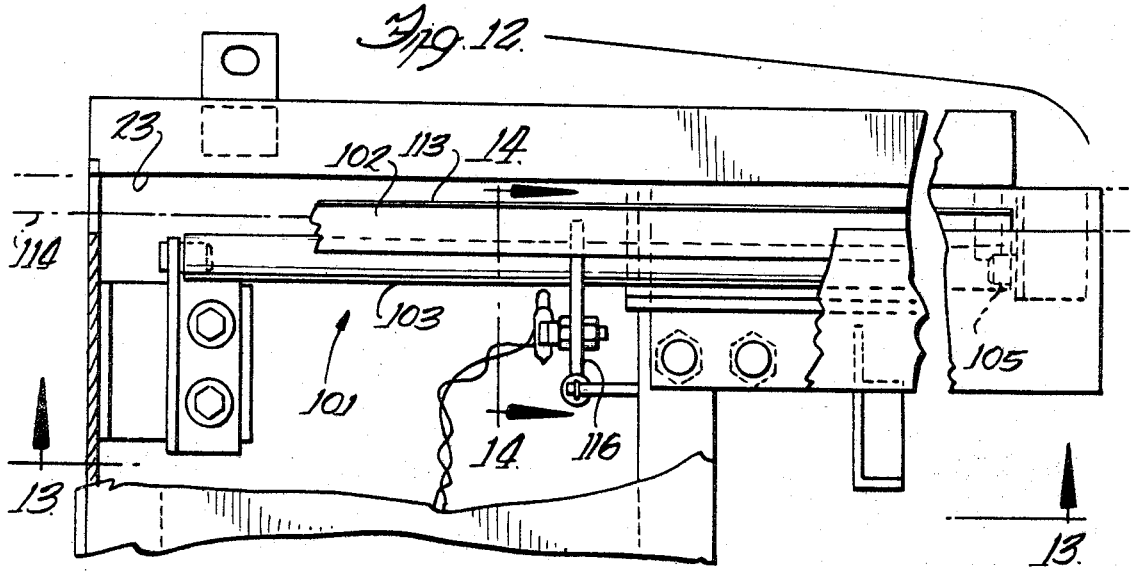
FIG. 12 is a fragmentary top plan view, partially in section, of a portion of a shunt slot, illustrating a protection device for preventing energization of the solenoid when a predetermined number of trucks are disposed in the shunt slot.

In the drawings, wherein is shown a preferred embodiment of this invention, and first particularly referring to FIGS. 1 through 3, inclusive, there is shown a tow truck system designated generally as 20. The tow truck system 20 comprises a floor surface 21, with a main slot 22 being provided therein and intersected by a shunt slot 23. The shunt slot 23 intersects the main slot 22 at an acute angle therewith. It should be understood that in a normal installation of a tow truck system of this type, there will be numerous shunt slots disposed at various locations along the main slot.

A tow truck 24, adapted to carry materials desired to be transported from one location to another, is propelled along the main slot 22 by means of a chain conveyor 26 which is guided beneath the floor surface by rail sections 27. The chain conveyor includes pusher dogs 28 disposed at set intervals therealong and adapted to engage a tow pin 29 mounted on the tow truck 24. When the tow truck 24 is properly loaded it is moved over the main slot 22 and the tow pin 29 is dropped into the main slot so that the next approaching pusher dog 28 will engage the tow pin and propel the tow truck along the main slot.

The truck 24 includes a pair of racks 31 mounted on the front portion 25 of the truck and disposed adjacent to and on either side of the tow pin 29. Each rack 31 is of channel shape in transverse cross section and has a series of aligned holes 32 passing through the horizontally extending parallel bars 33, the holes 32 being formed to receive probes 34. The probes 34 are positioned in any pair of the aligned holes 32 depending upon which of the numerous reed switches 35 in the system the truck is to operate. The reed switch 35 is similar to that sold by Hamlin Company under catalog number DR—1 and includes a pair of contacts which will close when a magnet is passed over the switch. The contacts of the reed switch are held in their closed position by means of a solenoid. When the electrical circuit is broken the solenoid will deenergize to allow the contacts to assume their normally open position.

As will be seen in FIG. 3 the probes 34 are positioned so that their lowermost end approaches but does not contact the floor surface 21. The lowermost end portion 39 of the probe 34 is magnetized so that the probe will operate the reed switch 35 as it passes thereover. It should now be apparent that the lateral distance of the reed switch 35 from the main slot 22 may be varied for different switches, and thereby provide a coded means for actuating the switching means of the present invention.

Referring now to FIGS. 4 through 11, wherein is illustrated in detail a switching means embodying the present invention, and first particularly referring to FIGS. 4 through 7 there is shown a switching means 40 with the cover plate 37 removed to expose the working components of the switch. The switching means 40 includes a switch plate 41 mounted for rotational movement on the cover plate 37 by means of a pin 42. The switch plate 41 is provided with a curved cam surface 43 which presents an abutment surface in the main slot when the switch plate is in its operative position as shown in FIG. 5. The cam surface 43 is formed to guide the tow pin into the shunt slot 23. As illustrated in FIG. 4, when the switch plate 41 is in its inoperative position, the back side 44 of the switch plate forms an integral part of the main slot and allows tow pin 29 to bypass the switch.

A pin 45 is mounted on the heel portion of the switch plate and projects generally downwardly therefrom. Another pin 46 is attached to the base 47 of the switch housing 48. A tension spring 49 is disposed between pins 45 and 46 with one end thereof being attached to each of the pins as illustrated in FIG. 7. Due to the eccentric location of pin 45 relative to the mounting pin 42 upon which the switch plate rotates, the spring 49 urges the switch plate toward its operative position.

Since it is desirable to have the switch normally in its inoperative position, the switching means is provided with a latch means 50 including a latch blade 51 mounted on the L-shaped bracket 61 for rotational movement. A toggle linkage system 53 connects the latch blade 51 to a solenoid 54. As is best illustrated in FIG. 6, the tip 56 of the latch blade 51 is cut off at an acute angle to facilitate disengagement of the latch blade from the projection 57 formed on the heel portion of the switch plate 41. The arrows shown in FIG. 6 illustrate the direction of movement of the latch blade 51 and the switch plate 41 when the switch is unlatched.

Referring now particularly to FIGS. 8 through 11, inclusive, wherein is illustrated the latching means 50 with the switch plate 41 removed to expose the components disposed therebelow, reference character 53 refers generally to a toggle linkage system including an L-shaped bracket 61 which is welded or otherwise attached to base plate 47. The L-shaped bracket has legs 62 and 63 which generally support the link arms which form the linkage system 53, said link arms being constructed of standard roller chain or conveyor chain links. Link arm 64 is a standard A-2 attachment type link fastened to leg 62 of bracket 61 by means of rivets 67. Link arm 66 is also an A-2 attachment type standard link of the same pitch length as that of link arm 64 but with the side bar containing the attachment bracket reversed to facilitate the fastening thereof to leg 63 by means of rivets 68. Link arms 64 and 66 are interconnected by means of a standard chain joint pin 69 and are positioned perpendicular one to the other.

Link arm 71 is identical to link arm 64 and normally positioned parallel thereto. Link arm 71 is attached to the latch blade 51 by means of bolts 72 and is pivotally attached to link arm 66 by means of a standard chain joint pin 73.

Link arms 74 and 76 are disposed between the adjacent end portions of link arm 64 and link arm 71 and are constructed of two pitches of standard roller chain, the length of the pitches of the chain from which link arms 74 and 76 are constructed being equal to one-half the length of the pitch of the chain from which links 64, 66 and 71 are constructed. With the arrangement described above, the five link arms 64, 66, 71, 74 and 76 in their normal position as shown in FIG. 8 form the four sides of a square.

Link arm 74 is pivotally connected to link arm 64 by means of standard chain joint pin 77, and link arm 76 is likewise pivotally connected to link arm 71 by means of a standard joint pin 78. The link arms 74 and 76 are interconnected for pivotable movement by an extended pin 79, as illustrated in FIG. 9. A tension spring 81 has one end portion thereof attached to the upper end portion of pin 79 by means of clip 82 and the other end attached to leg 63 of bracket 61 by means of a wire 83. The tension spring 81 urges the latch blade 51 toward its latching position, wherein it engages the projection 57 formed on the switch plate 41.

Solenoid 54 includes a stem 86 which is retractable into the solenoid when the latter is energized. The stem 86 is formed with a horizontal slot 87 and apertures 88 passing transverse of said slot. Plate 89 is fitted in the slot 87 and pivotally attached to the stem 86 by means of pin 91. Also, plate 89 is formed with an elongated aperture 92 adapted to fit over the extended pin 79 for connecting the pivotal joint between arms 74 and 76 to the solenoid 54. Movement of said pivotal joint toward the solenoid 54 due to the retraction of stem 86 causes the latch blade to rotate in a generally counterclockwise direction to disengage the tip 56 from the projection 57 formed on the switch plate 41. After the latch blade has been disengaged from the switch plate 41, the switch plate rotates to its operative position under the influence of spring 49.

Before the latch plate can return to its latching position under the influence of spring 81 the solenoid 54 has to be deenergized. To facilitate deenergization of solenoid 54, the tow truck switching system of the present invention also includes a deenergization means 91, which can best be seen in FIGS. 8 and 10. A mounting bracket 92 is welded or otherwise attached to the base plate 47 of the switch housing 48, and a cam plate 93 is mounted on the bracket by means of a nut and bolt 94 in a manner to permit rotational movement of the cam plate about a horizontal axis. The upper tip 96 of cam plate 93 is positioned to be contacted by the projection 57 of the switch plate 41 when the switch plate moves from its inoperative to its operative position. Contact of the tip 96 by the switch plate 41 will cause the cam plate 93 to rotate in a clockwise direction as viewed in FIG. 10.

A mercury switch 97, mounted on the lower portion of the cam plate 93 by means of the nut bolt 98, is positioned to be in its normally closed position when the cam plate 93 is in the position shown in FIG. 10. Rotation of the cam plate 93 in a clockwise direction causes the mercury switch 97 to tilt to a position wherein the contacts thereof are open. Opening of the contacts of the mercury switch 97 breaks the circuit between the electrical power source and the solenoid 54, therefore effecting deenergization of the latter and allowing the latch blade 51 to return to its latching position under the influence of spring 81. As the tow pin enters the shunt slot 23 it contacts cam surface 99 formed on the switch plate 41 and rotates the latter to its inoperative position allowing the latch blade 51 to re-engage the projection 57.

Referring now to FIGS. 12 through 17, inclusive, wherein is shown an overload protection device to be employed with the electrically actuated switching means described above, reference character 101 refers generally to the overload protection device. This device is normally installed at the terminal end of the shunt slot 23 and disposed entirely beneath the floor surface 21 in position to be contacted by a tow pin which has travelled to the end of the shunt slot. A tow truck which has been shunted off the main line will have sufficient momentum to carry it through the switch, and the next approaching truck travelling along the main slot will push the shunted truck part way down the shunt slot to a position wherein the approaching truck may pass. Therefore, a tow truck does not usually travel to the terminal end of a shunt slot unless the slot has the maximum allowable number of trucks disposed therealong. The overload protection device 101 prevents actuation of the switching means when the shunt slot is full and therefore unable to accept another truck.

Figure 13:
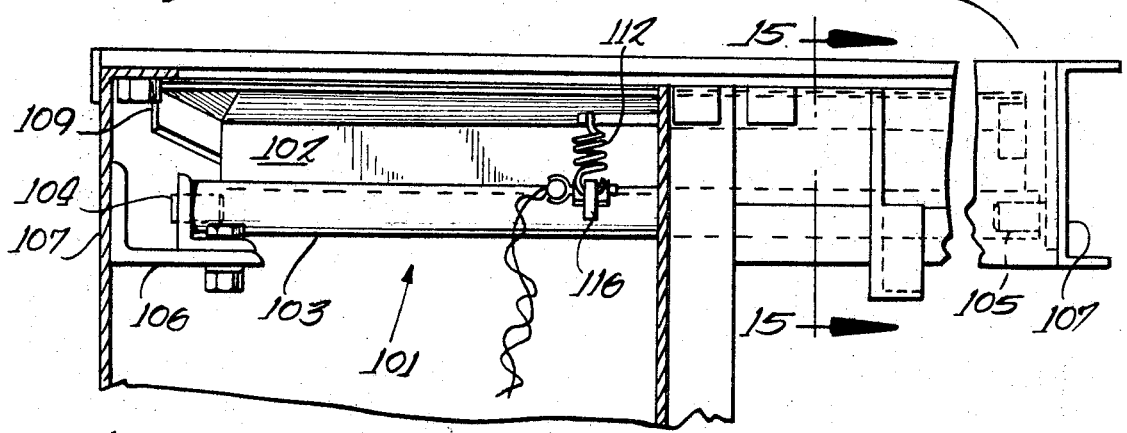
FIG. 13 is a sectional view taken on line 13—13 of FIG. 12.
Figure 14:
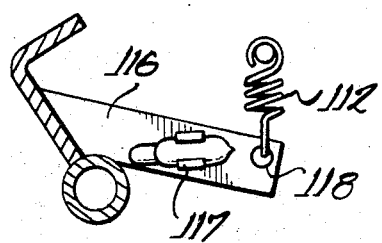
FIG. 14 is a sectional view taken along line 14—14 of FIG. 12.
Figure 15:
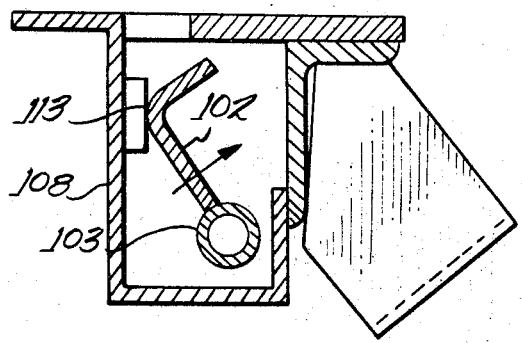
FIG. 15 is a sectional view taken along line 15—15 of FIG. 13.

The protection device 101 includes a contact bar 102 mounted in a lengthwise manner on a tube 103. The tube 103 and the contact bar 102 are mounted for rotational movement about the axis of the tube by means of pins 104 and 105 which are affixed by brackets 106 to the side walls 107 of a housing 108 embedded beneath the floor surface 21 adjacent to the terminal end of the shunt slot. As the protection device 101 is illustrated in FIGS. 12 and 13 a tow truck travelling along the shunt slot approaches the device from the left.

Figure 16:
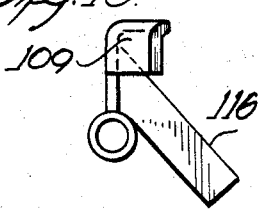
FIGS. 16 and 17 illustrate respectively the end and side views of the leading edge of the contact member of the protection device shown in FIG. 12.
Figure 17:
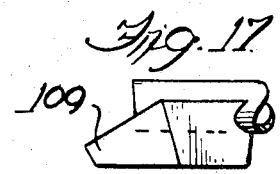

An attachment plate 116 is welded or otherwise secured to the bar 102 and has attached thereto a mercury switch 117 and a tension spring 112. The tension spring 112 urges the contact bar 102 toward its normal position, wherein the contact bar 102 projects into the shunt slot 23 to permit a tow pin to contact the leading edge 109 and rotate the bar in a clockwise direction to its operative position. The leading edge 109 of the bar 102 is tapered, as shown in FIGS. 16 and 17, to facilitate rotation of the bar 102 by the tow pin 29.

With the contact bar 102 in its normal position, the contacts of the mercury switch 117 are closed to permit completion of the circuit between the electric power source and the solenoid 54. Rotation of the contact bar 102 by the tow pin 29 tilts the mercury switch 117 to a position wherein the contacts thereof are open. When the contacts of mercury switch 117 are in their open position, the solenoid 54 cannot be energized, therefore the switch will not operate. Removal of the tow truck which is retaining the contact bar in its operative position allows the contact bar to assume its normal position under the influence of spring 112, thus closing the contacts of the mercury switch 117. In the manner described above the overload protection device 101 prevents an additional truck from being switched into the shunt slot when the maximum allowable number of trucks are disposed along the shunt slot 23.

Referring now to FIG. 18, wherein is shown the electrical circuit diagram of the present invention, reference character 120 refers generally to the complete circuit. The electrical circuit 120 consists of a series connection of a battery 126 (or other low voltage power source), the reed switch 35, the solenoid 54, the deenergization mercury switch 97 and the overload protection mercury switch 117. The circuit 120 is completed by the probe 34 passing over the reed switch 35 in a manner which closes the contacts thereof. The contacts of the reed switch 35 will remain closed until the circuit is broken, which occurs when the switch plate 41 rotates the cam plate 93 of the deenergization device 91 to open the contacts of the mercury switch 97. Opening the contacts of the mercury switch 97 will also deenergize solenoid 54 to allow the latch blade 51 to return to its latching position under the influence of spring 81. Resetting the switch plate to its inoperative position allows the contacts of the mercury switch 97 to close thus permitting re-energization of solenoid 54 by the next properly coded tow truck travelling along the main slot. When the overload protection device 101 is rotated to its operative position the contacts of mercury switch 117 are held in their open position to prevent completion of the electrical circuit by closing the contacts of the reed switch 35.

It is to be understood that the form of this invention herewith shown and described is to be taken as a preferred example of the same, and that various changes in the shape, size, and arrangement of parts may be resorted to without departing from the spirit of the invention.

I claim:
1. A tow truck switching system comprising:
   a reference surface having a main slot intersected by at least one shunt slot;
   switch plate means adjacent said intersection, said switch plate means being movable between an operative and an inoperative position, said switch plate means in its operative position presenting an abutment surface in the main slot for contact with a tow pin mounted on a tow truck travelling along said main slot to guide said tow pin into said shunt slot;
   means biasing said switch plate means toward its operative position;
   releasable latch means adjacent said intersection for retaining said switch plate means in its inoperative position;
   electric motor means;
   linkage means operatively connecting said motor means to said latch means for releasing said latch means in response to energization of said motor means, said linkage means being constructed to provide mechanical advantage in transmitting energy from said motor means to release said latch means; and
   means for automatically moving said switch plate means from its operative to its inoperative position after said tow pin has been guided into said shunt slot.
2. A tow truck switching system as defined in claim 1, further comprising:
   means for deenergizing said motor means in response to moving said switch plate means from its inoperative to its operative position.
3. A tow truck switching system as defined in claim 1, further comprising:
   a low voltage electric power source selectively connected to said electric motor means for energizing the latter; and
   means for selectively connecting said power source to said motor means in response to the approach of a tow truck.

4. A tow truck switching system as defined in claim 1, further characterized by:
   said switch plate means having a projection formed thereon;
   said latch means including a latch blade engageable with said projection for retaining said switch plate means in its inoperative position; and
   means for mounting said latch blade adjacent said projection.

5. A tow truck switching system as defined in claim 4, further comprising:
   said latch blade being mounted for pivotal movement between an engaging and non-engaging position; and
   means biasing said latch blade toward its engaging position.

6. A tow truck switching system as defined in claim 1, further comprising:
   an electric power source connected to said electric motor means for energizing the latter;
   at least one switch for alternatively making and breaking the connection between the electric power source and the electric motor means; and
   means associated with a tow truck for selectively operating said switch to make said connection and energize said electric motor means.

7. A tow truck system as defined in claim 6, further characterized by:
   said switch being a magnetically operated reed switch disposed adjacent said switch plate means; and
   said means for operating said switch being a magnetized member suspended from a tow truck and positioned to pass over said reed switch.

8. A tow truck system as defined in claim 1, further comprising:
   means associated with said shunt slot for preventing energization of said motor means when a predetermined number of trucks are disposed in said shunt slot.

9. A tow truck switching system as defined in claim 8, further characterized by said means for preventing energization of said motor means including:
   a pivotally supported member disposed below said reference surface adapted to be contacted by said tow truck, said member movable between an operative and an inoperative position, said member adapted to move to its operative position in response to contact by a tow truck;
   means for mounting said member; and
   a switch for preventing energization of said electric motor means when said member is in its operative position.

10. A tow truck switching system as defined in claim 1, further characterized by said linkage means including:
    a first link arm having one end portion thereof pivotally mounted;
    means for pivotally mounting said one end portion of said first link arm adjacent said latch means; and
    a second link arm having one end portion thereof pivotally connected to said latch means and the other end portion thereof pivotally connected to the other end portion of said first link arm, said electric motor means being connected to said linkage means for imparting movement to the interconnected end portions of said first and second link arms to operate said releasable latch means.

11. A tow truck switching system comprising:
    a reference surface having a main slot intersected by at least one shunt slot;
    switch plate means adjacent said intersection, said switch plate means mounted for rotational movement between an operative and an inoperative position, said switch plate means in its operative position presenting an abutment surface in said main slot for contact with a tow pin mounted on a tow truck travelling along said main slot to guide said tow pin into said shunt slot, said switch plate means having a projection formed thereon;
    means biasing said switch plate means toward its operative position;
    a latch blade mounted for rotation between a latching and a non-latching position, said latch blade in its latching position being engageable with said projection for retaining said switch plate means in its inoperative position;
    means for mounting said latch blade adjacent said projection;
    an electrically energized solenoid;
    toggle linkage means operatively connecting said solenoid to said latch blade for moving the latter to its non-latching position in response to energization of said solenoid;
    means for deenergizing said solenoid in response to said switch plate means rotating from its inoperative to its operative position; and
    means for automatically rotating said switch plate means to its inoperative position after said tow pin has been guided into said shunt slot.